United States Patent Office 2,920,003
Patented Jan. 5, 1960

2,920,003

COATED PHOSPHOR PARTICLES

Joseph A. Davis, Marion, Ind., assignor to Radio Corporation of America, a corporation of Delaware No Drawing. Application June 11, 1958
Serial No. 741,220

6 Claims. (Cl. 117—33.5)

This invention relates to improved luminescent materials which may be used for making viewing screens for cathode ray tubes, kinescopes for television and the like. The invention relates also to improved methods for preparing the luminescent materials herein and to improved methods for preparing luminescent screens.

Luminescent screens may be produced by first preparing a suspension of phosphor particles in a liquid and then settling the phosphor particles through the liquid on to a support for the screen. Subsequently, the supernatant liquid is decanted leaving a layer of phosphor material on the support. Zinc sulfide and zinc-cadmium sulfide phosphors have long been used in this type of process for making luminescent viewing screens for cathode ray tubes. A mixture of two different phosphors may be used to produce a white-emitting viewing screen for television kinescopes. For example, a blue-emitting zinc sulfide with silver activator (ZnS:Ag) or a yellow-emitting zinc-cadmium sulfide with silver activator (ZnCdS:Ag) mixed in the proper proportions and settled upon a support produces a white-emitting cathodoluminescent screen. This is referred to as a P–4 type screen.

When preparing luminescent screens by settling such phosphors from an aqueous suspension, certain difficulties are encountered. One difficulty is the tendency for the layer of settled material to be disturbed during the removal of the supernatant liquid. Frequently, there is relatively poor adherence to the support while the material is wet, so that the material tends to avalanche if the support is not horizontal or has areas which are inclined to the horizontal, such as the curved edges of the face of the tube. The ability of the phosphor particles to remain in place after they are settled and before drying is referred to as the "wet adherence" of the phosphor.

Subsequent to drying, the back of the layer of settled phosphor material is aluminized. This is usually accomplished by coating the back of the screen with an organic film, and then evaporating aluminum thereon. Filming and aluminizing strains the screen, frequently causing the screen to rupture and to tear. Rupturing and tearing during filming and aluminizing may be avoided by improved adherence of the settled layer to its support. The ability of the phosphor particles to remain in place after they have been settled and dried is referred to as the "dry adherence" or the "filming adherence" of the material.

It is known that the wet adherence of the phosphor may be improved by coating the individual particles thereof with calcium hydroxyphosphate. This coating may be produced by suspending the phosphor particles in an aqueous medium containing a soluble phosphate and soluble calcium salt, adjusting the pH in the range between 10.5 and 11.0, and then washing and drying the phosphor particles. Subsequently, the coated phosphor particles are again suspended in an aqueous medium and settled upon the face of the cathode ray tube or other support as described above. While such coatings are successful, nevertheless, a further improvement in the wet adherence of the phosphor is desirable. Very little has been taught as to filming adherence, and an improvement of this characteristic is also desirable.

An object of the invention is to provide luminescent materials having improved wet adherence and improved filming adherence.

A further object is to provide improved methods for treating phosphor particles to improve both the wet adherence and the filming adherence characteristics thereof.

Another object is to provide improved methods for preparing luminescent screens for cathode ray tubes.

The improved luminescent materials according to the invention comprise finely-divided phosphor particles, each particle having a thin coating of zirconium phosphate. By virtue of the particular coating, the phosphor particles exhibit improved wet adherence and improved filming adherence characteristics in subsequent screen-making processes.

The improved luminescent materials herein may be prepared by coating particles of phopshor, such as silver activated zinc or zinc-cadmium sulfide, with a thin layer of zirconium phosphate. A preferred method of the invention comprises suspending the phosphor particles in an aqueous medium containing a soluble phosphate, such as ammonium dihydrogen phosphate, and a soluble zirconium salt, such as zirconyl nitrate dihydrate, and then washing and drying the phosphor particles.

*Example.*—A preferred procedure for coating blue emitting zinc sulfide will now be described. Slurry 500 grams of the phosphor with 1500 ml. of demineralized water. A suitable blue-emitting zinc sulfide is prepared by firing an intimate mixture of 100 grams zinc sulfide, 0.011 gram silver as silver chloride, 2 grams magnesium chloride, 2 grams ammonium chloride, and 0.5 gram trisoduim phosphate at about 980° C. in a covered beaker for about 45 minutes. To this slurry add in order:

(a) A solution of 0.5 gram zirconyl nitrate dihydrate in 50 ml. demineralized water. The slurry is then stirred for several minutes.

(b) A solution of 0.5 gram ammonium dihydrogen phosphate in 50 ml. demineralized water. This latter solution is added slowly to the slurry while maintaining vigorous stirring.

At this point, zirconium phosphate has been precipitated upon the phosphor particles forming a thin coating thereon. The coated phosphor particles are washed twice on a filter funnel with 1000 ml. proportions of demineralized water and then dried over-night at 120° C. The dry product is sieved through 200 mesh prior to use.

The product comprises dry phosphor particles, each particle having a thin coating of zirconium phosphate thereon. The zirconium phosphate comprises 0.1 weight percent of the weight of the phosphor. The product is similar in character to the conventional product except that the relative wet adherence is increased by about 40% and the filming adherence is increased by about 200%. The conventional product used for comparison is silver-activated zinc sulfide particles having a calcium hydroxy-phosphate coating thereon.

*Reagents.*—Other substances may be used in place of zirconyl nitrate dihydrate. Any soluble zirconium salt such as zirconyl sulphate and zirconyl chloride may be used. Similarly, any soluble phosphate may be used in place of ammonium dihydrogen phosphate. Other suitable phosphates are sodium phosphates, and potassium phosphates.

*Concentration ranges.*—The amount of zirconium phosphate may be about 0.05 to 2.0 weight percent of the phosphor to be coated. The preferred amount is 0.1 to 0.4 percent by weight. There is an optimum proportion for each type of phosphor to be coated. The preferred concentration for silver-activated zinc sulfide is coated on the phosphor particles of the example.

*Phosphors.*—The process is equally effective for coating other phosphors, steps identical to the steps of the example may be carried out on silver-activated zinc-cadmium sulfide and for zinc and zinc-cadmium sulfides prepared with other activators such as copper, gold, manganese, lead, and tin. Similarly, the invention herein may be used in combination with the following activated host crystals: zinc selenide, zinc telluride, cadmium selenide and cadmium telluride.

*Wet adherence test.*—A luminescent screen is prepared by settling from an aqueous medium upon a 2" x 2" plate. Three hundred ml. of "cushion" is dispensed into a 400 ml. beaker. The cushion consists of 224 ml. barium acetate in 6276 ml. water for one test run of 21 beakers. Into each beaker 50 ml. of phosphor suspension is dispensed using an inverted 50 ml. pipette with a stainless steel underwater spray nozzle. The phosphor suspension is prepared as follows: (1) for standard phosphor only, three grams of the phosphor is stirred for one minute in 100 ml. silicate solution and 600 ml. water, (2) for test phosphors, three grams of the phosphor is stirred for 59 minutes in 600 ml. water, and then for one additional minute after addition of 100 ml. potassium silicate. The phosphor is allowed to settle for 20 minutes, at which time the breakers are transferred to the jet impingement unit for test.

The wet adherence is tested by jet impingement. A stream of tap water is directed at the screen through the settling solution to erode a hole in the screen. The tap water passes through a 1.2 mm. capillary tube nozzle placed one inch above the beaker platform. The water head is adjusted to result in a flow rate through this nozzle of 154±2 ml. per minute. The diameters of the eroded holes are measured in cm. and are averaged for the three beakers run on each phosphor.

*Calculations.*—The hole diameter itself is a satisfactory expression of wet adherence. However, to compare to former data, the hole diameter is converted to the "wet adherence unit" by the following means: Wet adherence equals $8.21/diam.^2$. The "wet adherence unit" is the reciprocal of the hole area in square inches, the 8.21 being the conversion factor. The wet adherence unit is converted into "relative wet adherence" (R.W.A. in the table) as follows: Relative wet adherence (R.W.A.) of the test phosphor equals W.A. test/W.A. std.×4.5. The "relative wet adherence" of the present standard is 4.05. Expressing the results in terms of relative wet adherence, or "adherence relative to the standard" tends to eliminate small day-to-day test fluctuations.

*Filming adherence test.*—A luminescent screen is prepared by settling from an aqueous medium upon the face plate of a 21" 90° bulb. A cushion, consisting of 770 cc. barium acetate at 8.67 grams per liter solution and 17,000 cc. cold demineralized water is dispensed into the bulb on a pouroff table. A silicate solution, consisting of 1145 cc. dilute potassium silicate and 1000 cc. water, is dispensed next through a funnel and metal composite nozzle. Exactly 5 minutes later, the phosphor layer, consisting of 6.875 grams of phosphor and 500 cc. water, is dispensed through a funnel and the SS-18 plastic nozzle. Settling time is 30 minutes, pouroff rate is 6 to 7 minutes per 180°. Exactly 15 minutes after the start of pouroff, the air driers are turned on to 17 p.s.i.g. and the screens allowed to dry. The first spot to dry (should take slightly over 2 minutes) is marked and the test is performed in this region.

The "wet" or "filming" adherence is tested by jet impingement. The screen is rewetted gently on the barrel rinse position. Exactly three minutes later, water at 40 p.s.i.g. is sprayed at the test area on the screen through a 0° deflection 1 gallon per minute nozzle (Spraying Systems Co., Number 0010). The timing of this water spray is 3 seconds on, 2 seconds off, for a total of 4 times. The diameters of the eroded holes are measured in cm., averaged, and reported as "filming adherence" (F.A. in the table).

*Data.*—The table sets forth the relative wet adherence (R.W.A.) and the filming adherence (F.A.) for silver-activated zinc and zinc-cadmium sulfide phosphors having different coatings and coating weights.

Table

| Phosphor | Coating | R.W.A. | F.A. |
|---|---|---|---|
| ZnS:Ag | 0.1% Zirconium phosphate | 3.0 | 0.9 |
| ZnS:Ag | 0.1% Zirconium phosphate | 3.2 | 1.2 |
| ZnS:Ag | 0.2% Zirconium phosphate | 3.2 | 2.2 |
| ZnS:Ag | 0.5% Zirconium phosphate | 2.6 | |
| ZnS:Ag | 1.0% Zirconium phsophate | 2.6 | |
| ZnS:Ag | 2.0% Zirconium phosphate | 0.3 | |
| ZnS:Ag | 0.1% Zirconyl nitrate (no phosphate) | 2.7 | |
| ZnS:Ag | Calcium hydroxyphosphate | 2.4 | 3.0 |
| ZnS:Ag | ...do... | 2.1 | 3.0 |
| ZnCdS:Ag | 0.1% Zirconyl phosphate | 4.6 | 0.95 |
| ZnCdS:Ag | 0.2% Zirconyl phosphate | 5.0 | 0.90 |
| ZnCdS:Ag | 0.5% Zirconyl phosphate | 4.8 | 1.05 |
| ZnCdS:Ag | 1.0% Zirconyl phosphate | 3.0 | |
| ZnCdS:Ag | 2.0% Zirconyl phosphate | 1.6 | |
| ZnCdS:Ag | 0.2% Zirconyl phosphate | 4.1 | 0.80 |
| ZnCdS:Ag | ...do... | 4.1 | 0.85 |
| ZnCdS:Ag | Calcium hydroxyphosphate | 3.4 | 1.2 |
| ZnCdS:Ag | ...do... | 4.1 | 1.35 |

What is claimed is:

1. A luminescent material comprising finely-divided phosphor particles, each particle having a thin coating of zirconium phosphate.

2. A luminescent material comprising phosphor particles selected from the group consisting of silver-activated zinc sulfide and silver-activated zinc-cadmium sulfide, each particle having a thin coating of zirconium phosphate.

3. A luminescent material comprising finely-divided silver-activated zinc sulfide phosphor particles, each particle having a thin coating of zirconium phosphate.

4. A luminescent material comprising finely-divided silver-activated zinc-cadmium sulfide phosphor particles, each particle having a thin coating of zirconium phosphate.

5. A luminescent material comprising finely-divided silver-activated zinc sulfide phosphor particles, each particle coated with between 0.1 and 0.4 weight percent of zirconium phosphate with respect to the weight of said phosphor.

6. A luminescent material comprising finely-divided silver-activated zinc-cadmium sulfide phosphor particles, each particle coated with between 0.1 and 0.4 weight percent of zirconium phosphate with respect to the weight of said phosphor.

References Cited in the file of this patent

UNITED STATES PATENTS

| | | |
|---|---|---|
| 2,697,668 | Crosby et al. | Dec. 21, 1954 |
| 2,704,726 | Markoski | Mar. 22, 1955 |
| 2,758,941 | Crosby et al. | Aug. 14, 1956 |
| 2,774,682 | Larach | Dec. 18, 1956 |